United States Patent
Gendre et al.

(10) Patent No.: US 10,227,144 B2
(45) Date of Patent: Mar. 12, 2019

(54) TOWING VEHICLE FOR MANEUVERING AN AIRCRAFT AND FOR SUPPLYING PRESSURIZED AIR TO AN AIRCRAFT DURING THE TAXIING PHASE BEFORE TAKEOFF

(71) Applicant: Airbus SAS, Blagnac (FR)

(72) Inventors: Didier Gendre, Toulouse (FR); Kevin Goburdhun, Paris (FR); Alexandre Fouillot, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 180 days.

(21) Appl. No.: 15/218,792

(22) Filed: Jul. 25, 2016

(65) Prior Publication Data
US 2017/0029136 A1    Feb. 2, 2017

(30) Foreign Application Priority Data

Jul. 31, 2015 (FR) .................................. 15 57357

(51) Int. Cl.
| | | |
|---|---|---|
| B64F 1/22 | (2006.01) | |
| B64F 1/34 | (2006.01) | |
| F17C 5/06 | (2006.01) | |

(52) U.S. Cl.
CPC ............... B64F 1/22 (2013.01); B64F 1/225 (2013.01); B64F 1/34 (2013.01); F17C 5/06 (2013.01); F17C 2221/031 (2013.01); F17C 2223/0123 (2013.01); F17C 2250/032 (2013.01); F17C 2265/061 (2013.01); Y02T 50/826 (2013.01)

(58) Field of Classification Search
USPC ...... 137/899.2, 342, 615; 248/49–93; 226/8, 226/162; 414/161, 790.8; 244/114, 115, 244/138 R
See application file for complete search history.

(56) References Cited

U.S. PATENT DOCUMENTS

| | | |
|---|---|---|
| 2,968,923 A | 1/1961 | Coleman |
| 4,289,095 A * | 9/1981 | Scherr ..................... F01M 5/001 123/142.5 E |
| 4,658,924 A | 4/1987 | Dobbie |
| 5,381,987 A * | 1/1995 | Carns ....................... B64F 1/22 123/142.5 R |
| 6,424,891 B1 | 7/2002 | Sargent et al. |

FOREIGN PATENT DOCUMENTS

GB    2175550    12/1986

OTHER PUBLICATIONS

French Search Report, dated Apr. 19, 2016, priority document, FR 1557357.

* cited by examiner

*Primary Examiner* — Marina Tietjen
*Assistant Examiner* — Daphne M Barry
(74) *Attorney, Agent, or Firm* — Greer, Burns & Crain, Ltd.

(57) ABSTRACT

A mobile vehicle for supplying pressurized air to an aircraft, the vehicle being configured to tow the aircraft during its movements on the ground and including a pneumatic supply system configured to supply pressurized air to the aircraft, the pneumatic supply system being manually connectable to a high-pressure connector of the aircraft and remotely disconnectable from the connector.

6 Claims, 5 Drawing Sheets

TOWING VEHICLE FOR MANEUVERING AN AIRCRAFT AND FOR SUPPLYING PRESSURIZED AIR TO AN AIRCRAFT DURING THE TAXIING PHASE BEFORE TAKEOFF

CROSS-REFERENCES TO RELATED APPLICATIONS

This application claims the benefit of the French patent application No. 1557357 filed on Jul. 31, 2015, the entire disclosures of which are incorporated herein by way of reference.

BACKGROUND OF THE INVENTION

This invention relates to the domain of ground service for aircraft and relates more particularly to a towing vehicle for maneuvering an aircraft and for supplying pressurized air to the aircraft during the taxiing phase before takeoff.

The taxiing phase of an aircraft before its takeoff is the phase during which the aircraft moves up to the threshold of a runway, taking traffic lanes or "taxiways."

In order to ensure its movement on the taxiways, an aircraft conventionally uses its engines. Operating the engines on the ground consumes a significant quantity of fuel and this problem is exacerbated by the formation of queues of aircraft waiting before the threshold of the runway.

A solution envisaged for this problem consists in towing the aircraft, with the engines shut down, on the taxiways using towing vehicles dedicated to ground service for the aircraft.

This solution involves providing a pneumatic supply to the aircraft during towing in order to make certain systems of the aircraft function (air conditioning, cooling for the avionics, etc.) and in order to be able to start the engines before the runway threshold. Some towing vehicles are equipped with pneumatic means, manually connectable to the aircraft, in order to provide such a pneumatic supply. However, the manual disconnection of these pneumatic means of the aircraft necessitates an operator descending onto the taxiways, which is strictly forbidden by the aeronautical regulations. This solution is therefore not implemented.

SUMMARY OF THE INVENTION

An aim of the invention is to resolve this problem. To that effect, the invention relates to a towing vehicle for maneuvering an aircraft and for supplying pressurized air to the aircraft, the vehicle being configured to tow the aircraft during its movements on the ground and including a pneumatic supply system capable of supplying pressurized air to the aircraft and being manually connectable to a high-pressure connector on the aircraft and remotely disconnectable (via an automatic disconnection) from the connector.

The invention allows the aircraft to be moved by the vehicle up to the runway threshold without starting the engines. The invention therefore allows the airline companies to make substantial savings on fuel. This is because the fuel consumption of the vehicle, both for towing the aircraft and for supplying it with pressurized air, is very low compared with the consumption of an aircraft engine, even at idling speed. During the movement of the aircraft, the pneumatic supply system of the vehicle provides the pneumatic supply necessary for correct functioning of the aircraft systems. This supply is necessary in particular for starting the engines before the runway threshold.

Remote disconnection of the pneumatic supply system satisfies the airport safety requirements in that it makes it possible to avoid an operator descending from the vehicle onto the taxiway in order to disconnect the pneumatic supply system from the aircraft.

BRIEF DESCRIPTION OF THE DRAWINGS

The abovementioned characteristics of the invention, along with others, will emerge more clearly on reading the following description of embodiment examples, the description being made in relation to the attached drawings, among which.

DETAILED DESCRIPTION OF THE PREFERRED EMBODIMENTS

Figure 1:
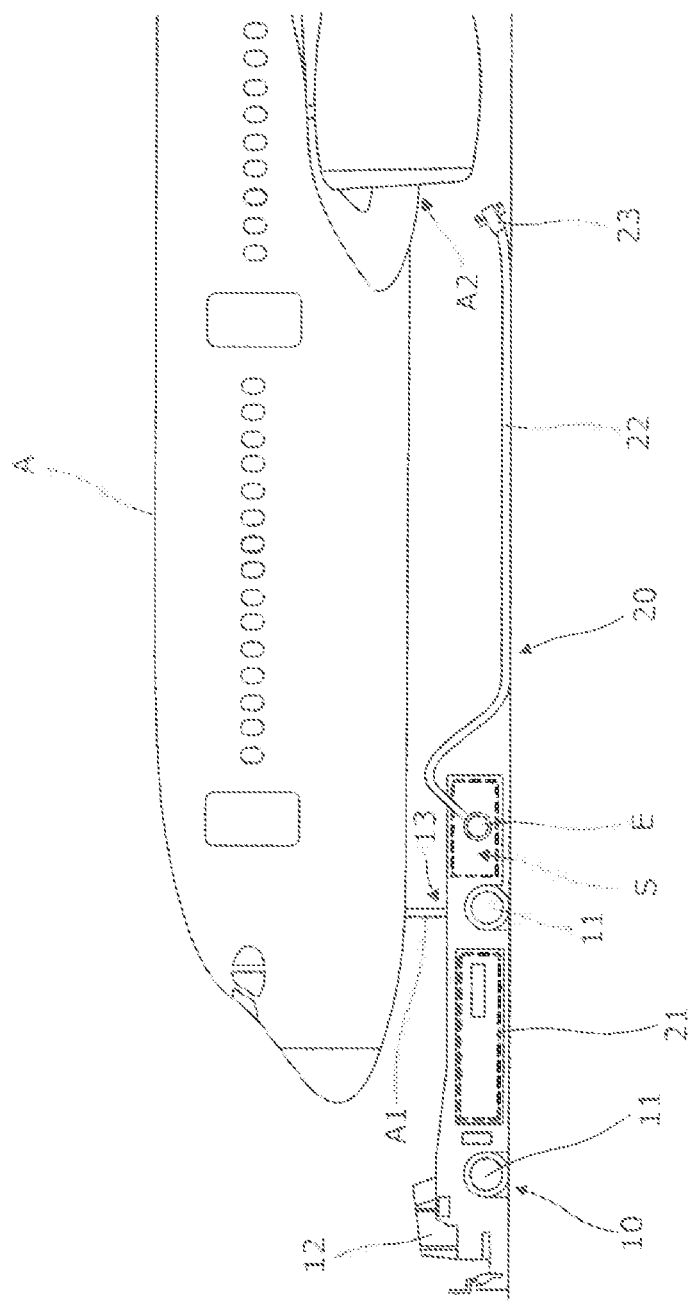
FIG. 1 is a diagram of the vehicle according to an embodiment of the invention, the vehicle including a pneumatic supply system and a controlling system for controlling the pneumatic supply system, the pneumatic supply system including an air conduit such as a flexible pipe equipped with a pipe fitting manually connectable to a high-pressure connector of the aircraft in order to supply pressurized air to the aircraft and automatically disconnectable from the connector under control of the controlling system.
Figure 2:
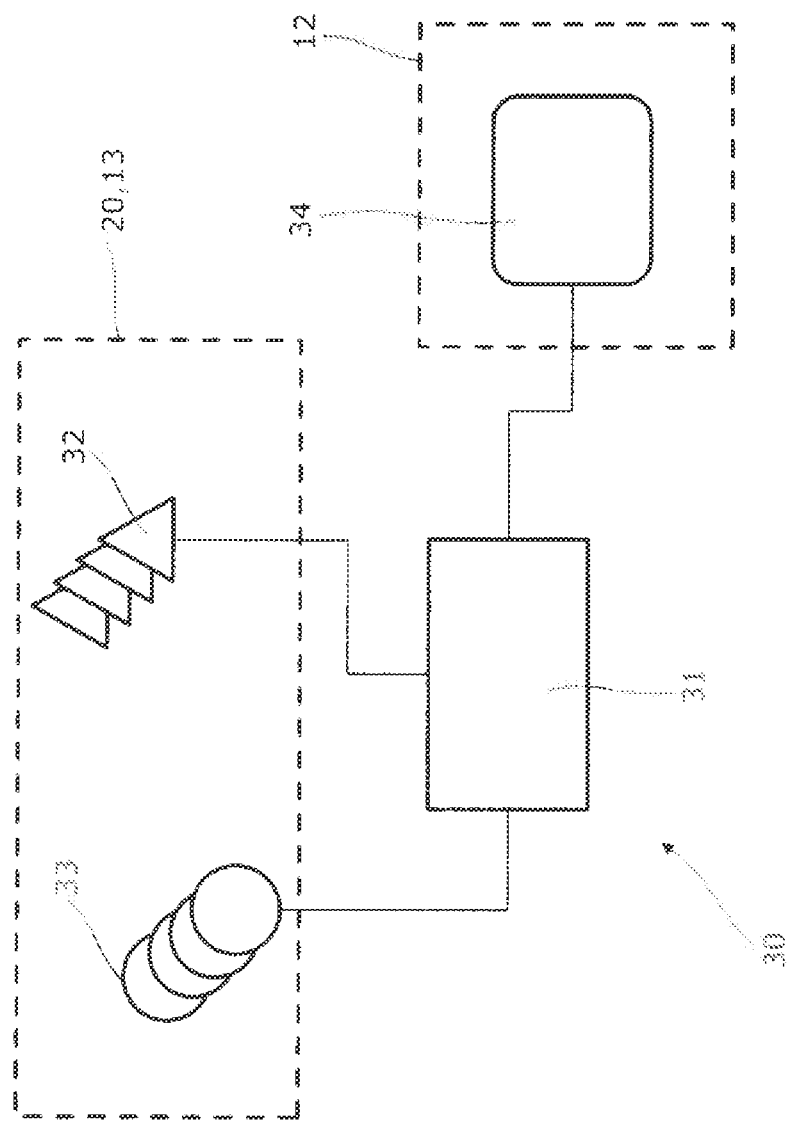
FIG. 2 is a schematic view of the controlling system of the mobile vehicle represented on FIG. 1.

With reference to FIGS. 1 and 2, the vehicle 10 according to an embodiment of the invention is configured to tow an aircraft A and is equipped with a pneumatic supply system 20 for supplying pressurized air to the aircraft A during towing.

The vehicle 10 is of the type present at airports for ground service for aircraft. In particular, the mobile vehicle is a wheeled motorized towing vehicle capable of towing an aircraft on the taxiways of the airport. The vehicle conventionally includes a chassis (not represented) to which the wheels are fixed, and, mounted on the chassis, a driver compartment 12 of the vehicle, the pneumatic supply system 20, a mechanism 13 for coupling the vehicle to the nose landing gear A1 of the aircraft, together with a controlling system 30 (not represented on FIG. 1) for controlling the coupling mechanism 13 and the pneumatic supply system 20.

The coupling mechanism 13, such as, for example, a system for raising and fastening the wheel of the aircraft nose landing gear A1 onto a supporting plate of the vehicle, are well known to the person skilled in the art and are not described in further detail in the description. When the coupling mechanism 13 is coupled to the nose landing gear A1, the vehicle 10 can be used to tow the aircraft A on the taxiways.

The controlling system 30 includes a central unit 31 arranged in the vehicle 10 and which is electrically connected to sensors 32 and to a plurality of actuators 33 arranged on the pneumatic supply system 20 and the coupling mechanism 13. The central unit is furthermore linked with a man-machine interface 34 placed in the driver compartment 12 of the vehicle, through which the operator of the vehicle can interact with the actuators 33 in order to control the pneumatic supply system 20 and the coupling mechanism 13.

The pneumatic supply system 20 is configured to be manually connected to the aircraft A by an operator and are controllable from the driver compartment 12 of the vehicle via the controlling system 30. The controlling system 30 furthermore makes it possible to display on the man-machine interface 34 functioning data of the pneumatic supply system obtained by the sensors 32.

According to the invention, the pneumatic supply system 20 can be remotely disconnected from the aircraft A via the actuators 33 of the controlling system 30 through the interaction of an operator with the man-machine interface 34.

The pneumatic supply system 20 includes an air compressor 21, a flexible air pipe 22 connected to the compressor 21, a pipe fitting 23 situated at the free extremity of the air pipe, allowing the pipe to be connected to a high-pressure connector A2 of the aircraft. The actuators 33 of the controlling system allowing the pneumatic supply system 20 to be disconnected from the aircraft are electrically connected to the central unit 31 via a network of electric cables arranged on the pipe 22.

The air compressor 21 is lodged in a compartment of the vehicle and its function is to supply compressed air to the pipe 22 to which the compressor is linked. The functioning of the compressor is controlled (via at least one actuator 33 of the controlled switch type) and monitored (via at least one sensor 32) by the central unit 31.

Figure 3:
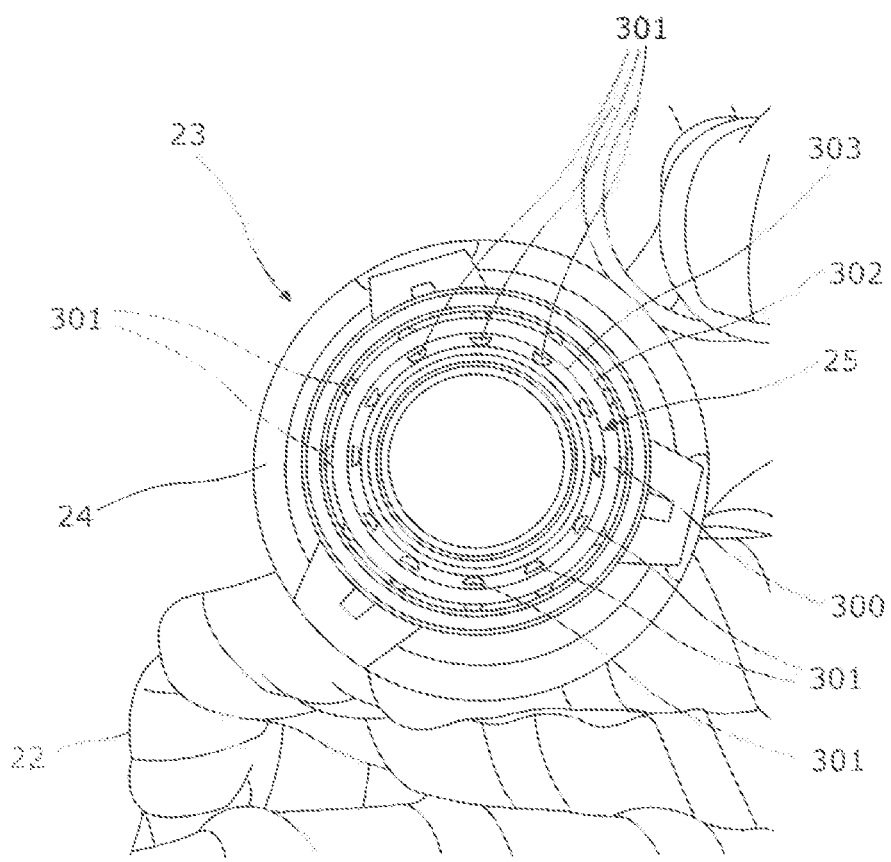
FIG. 3 is a schematic view of the pipe fitting of the air pipe represented on FIG. 1.

With reference to FIG. 3, the pipe fitting 23 has a cylindrical shape and is intended to be fitted around the high-pressure connector A2 of the aircraft. The pipe fitting 23 includes a damping device 24 and a device 25 for connecting/disconnecting the pipe fitting, the device 25 being associated with actuators 33 of the controlling system. The device 25 for connecting/disconnecting the pipe fitting allows manual connection of the pipe fitting to the high-pressure connector A2 and remote (automatic) disconnection of the connector through activation of the actuators 33.

In a known manner, the high-pressure connector A2 of an aircraft is presented in the shape of a vertical (relative to the fuselage) cylindrical part having a groove on its periphery, and arranged in a duct situated under the fuselage of the aircraft, between its nose landing gear A1 and its main landing gears (not represented). The duct includes a valve, linked to pivot with the fuselage of the aircraft A, making it possible to close or to access the duct. In the closed position of the valve, the latter represents a uniform surface with the skin of the aircraft fuselage. The valve can be opened manually and forced to the closed position by the action of a spring.

The connection/disconnection device 25 includes a circular cage 300 arranged at the extremity of the pipe fitting 23. The cage encloses a plurality of balls 301, and, associated with each ball, also encloses a spring in compression (not represented) and an actuator 33 (not represented) of the controlling system, for example of a solenoid type.

The cage 300 is formed from two circular rings 302-303 welded together, with a ring 302 of a larger diameter forming the exterior periphery of the cage and a ring 303 of a smaller diameter forming the interior periphery of the cage. Each ring includes openings (not represented) facing openings made in the other ring. Each opening has a diameter equal to at the most 90% of that of a ball 301, such that each ball inserted between the two openings can move radially between the two openings towards the exterior of the cage 300 and protrude partially outside the cage (on the interior or exterior periphery side), at the same time being constrained in the cage.

For each ball 301, the spring in compression is inserted between the ball 301 and the ring 302 of the larger diameter in order to force the movement of the ball towards the ring 303 of the smaller diameter. Each ball 301 is furthermore equipped with a finger fastened to an arm of the actuator 33 associated with the ball. The actuator 33 can be activated by the central unit 31 in order to push the ball 301 towards the ring 302 of the larger diameter with a force greater than that of the spring in compression. When the actuator 33 is not activated, it exerts no force on the ball.

In functioning, when the operator inserts the pipe fitting 23 around the high-pressure connector A2, the balls 301 pushed by the spring will be inserted into the groove of the high-pressure connector A2 and will consequently make it possible to keep the pipe fitting 23 connected to the connector. When the actuators 33 of the cage are activated (simultaneously supplied with power), they push the balls 301 back out of the groove in the high-pressure connector A2 such that the pipe fitting 23 falls to the ground under its own weight.

The damping device 24, in turn, is constituted by a protective collar in metal or an elastic material surrounding the pipe fitting 23, and which has the aim of protecting the pipe fitting when the latter falls to the ground.

Figure 4:
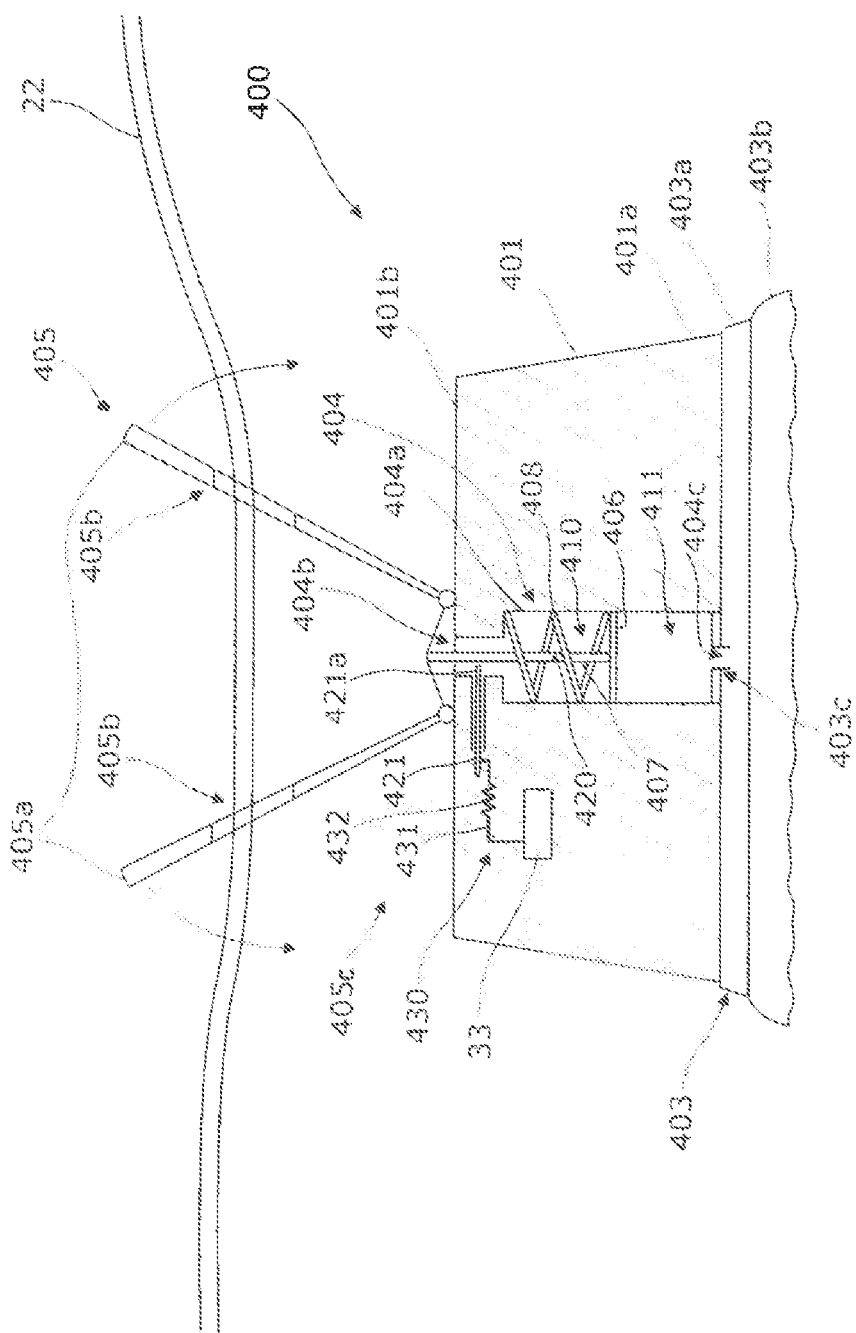
FIG. 4 is a schematic view of a device for suspending the air pipe represented on FIG. 1 on the fuselage of an aircraft, the device being able to be suspended manually on the fuselage of an aircraft and being able to be de-suspended remotely under control of the controlling system represented on FIG. 2.
Figure 5:
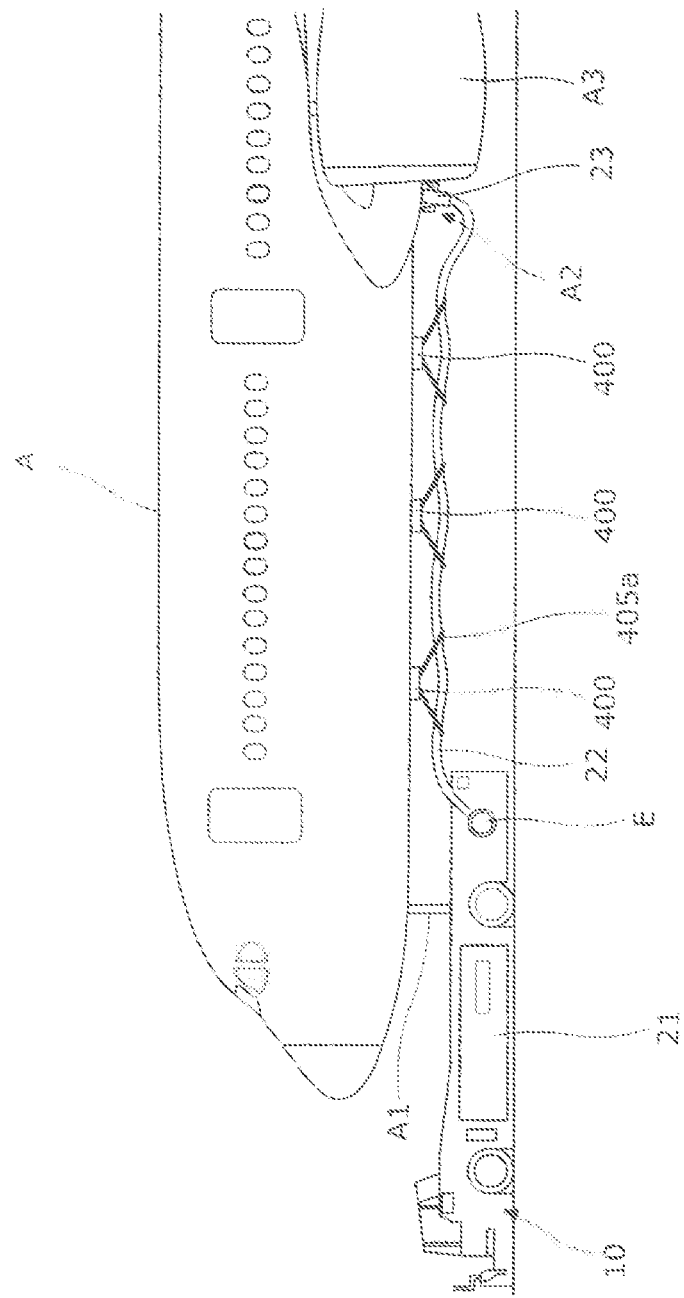
FIG. 5 is a view similar to FIG. 1 representing the vehicle according to another embodiment of the invention, in which the pneumatic supply system is connected to the aircraft, the system including a plurality of suspension devices such as represented on FIG. 4 suspended on the fuselage of the aircraft in order to hold the pipe under the fuselage away from the ground when towing the aircraft.

With reference to FIGS. 4 and 5, the pneumatic supply system preferably includes at least one device 400 for suspending the pipe on the fuselage of the aircraft A. The implementation of a suspension device is advantageous for holding the pipe 22 under the fuselage, away from the ground, so as not to damage the pipe 22 while the aircraft is taxiing, in particular in the case where the high-pressure connector A2 is distanced from the nose landing gear A1 of the aircraft.

A suspension device 400 includes a chassis 401 having a first side 401*a* and a second side 401*b* substantially parallel to each other, with a pneumatic suction cup 403 arranged at the first side 401*a*, and a damping device (not represented on FIGS. 4 and 5) arranged in the area of the second side 401*b*. The suspension device 400 furthermore includes a vacuum pump 404 associated with the suction cup 403 in order to be able to suspend the suspension device on a fuselage A, together with a device 405 for arming/disarming the suction cup associated with an actuator 33 of the controlling system. The arming/disarming device 405 allows manual arming (suspending the suction cup on the fuselage) of the suction cup 403 and remote disarming (de-suspending of the suction cup) of the suction cup 403 via activation of the actuator 33.

The pneumatic suction cup 403 includes a base 403*a* fastened to the first side 401*a* and a lip 403*b* fastened to the base. The base 403*a* of a circular shape is molded in a first relatively stiff material, whereas the lip 403*b*, intended to be placed in contact with the fuselage of an aircraft A, surrounds the base 403*a* and is made in a second relatively supple material.

The vacuum pump 404 includes a cylindrical casing 404a arranged in the chassis 401 and leading to a first extremity 404b outside the chassis at its second side 401b and to a second extremity 404c at an opening 403c made in the base of the suction cup 403. The pump 404 includes a mobile piston 406 in the casing 404a and a rod 407 for supporting the piston. The piston 406 delimits two chambers in the casing, namely a first chamber 410 between the first extremity 404b of the casing and the piston and a second chamber between the second extremity 404c of the casing and the piston. The piston 406 is fastened to the rod 407, which extends in the first chamber along the longitudinal axis of the casing 404a. In the further description, what is called high position of the rod will be the position of the rod at which the piston 406 is situated at the first extremity 404b of the casing.

The arming/disarming device 405 includes at least one handle 405a, a retaining arrangement 405c for retaining the rod 407 in the high position, and a compression spring 408 arranged in the first chamber in order to force the piston to move to the second chamber. The retaining arrangment 405c for retaining the rod 407 in the high position are associated with the actuator 33 of the controlling system 30, of the servocontrol type, which makes it possible to release the rod when it is activated by the central unit 31.

It should be noted that, in FIGS. 4 and 5, the arming/disarming device 405 includes two handles 405a actionable by an operator.

Each handle 405a includes a hollow frame 405b through which passes the air pipe 22, which is fastened to the handle via conventional devices of the retaining ring type. The handle 405a is hinged on the chassis 401 and is integral with the rod 407 such that operating the handle has the effect of moving the rod. Due to the force exerted by the spring 408 in compression, the handle 405a has a rest position substantially perpendicular to the chassis 401, in which position the piston 406 is pressed down at the second extremity 404c of the casing. Operating the handle 405a on the part of the operator, that is to say, rotating the handle to a position where the latter is substantially parallel to the chassis 401 of the suspension device 400, moves the rod 407 to the first extremity 404b of the casing up to the high position of the rod. Such a movement of the rod brings the piston 406 to the first extremity 404b of the casing, which has the effect of creating a depression in the pneumatic suction cup 403 when the lip 403b is in contact with a fuselage of the aircraft A.

The retaining arrangement 405c for retaining the rod in the high position includes a slot 420 arranged on the rod 407 at a predetermined position, and a rigid strip 421 fastened to the chassis via a mobile mechanism 430 coupled to the actuator 33. The strip 421 extends perpendicular to the rod and includes a free extremity 421a at the rod. The mobile mechanism 430 includes a mobile pin 431, perpendicular to the rod, to which the strip 421 is fastened through a compression spring 432 forcing the free extremity of the strip to come into contact with the rod. The mobile pin 431 is fastened at its other extremity to the actuator 33, which, when activated, moves the mobile pin 431 translationally along an axis perpendicular to the rod 407 such that the free extremity 421a of the strip moves away from the rod.

In functioning, when the slot 420 is situated opposite the strip 421, the free extremity 421a of the latter, forced by the spring 432, is inserted into the slot 420 and therefore blocks any movement of the rod 407. The rod 407 is then blocked in the high position and a depression can be maintained in the pneumatic suction cup 403 when its lip 403b is in contact with a fuselage A. When the actuator 33 is activated, the free extremity 421a of the strip disengages from the slot 420 and the rod 407 is then no longer held. Consequently, the piston 406 pushed by the spring 408 moves to the second extremity 404c of the casing, which makes it possible to insufflate air at the base 403a of the pneumatic suction cup. When the suction cup 403 is stuck to the fuselage A, the movement of the piston 406 to the second extremity of the casing 404c makes it possible to unstick the suction cup 403 and to make the suspension device 400 fall to the ground under the effect of its weight.

The damping device of the suspension device in turn is constituted by a part made in foam or an airbag whose aim is to absorb the shock when the suspension device 400 falls to the ground.

The vehicle 10 preferably includes a stowage compartment S in which the air pipe 22, the pipe fitting 23 and the suspension devices 400 (if the pneumatic supply system is provided with such) can be stowed when the pipe 22 is not deployed. To that effect, the controlling system 30 advantageously includes an actuator 33, of the electric motor type, associated with a winder E arranged in the stowage compartment S and on which the pipe 22 is wound, in order to be able to wind the pipe 22 and the suspension devices 400 fastened to the pipe automatically at the request of an operator interacting with the man-machine interface 34.

With reference to FIG. 5, utilization of the vehicle 10 according to the invention will now be described for moving an aircraft A on the taxiways in order to reach the runway threshold. It should be noted in the example illustrated on FIG. 5 that the pneumatic supply system 20 of the vehicle 10 includes a plurality of suspension devices 400.

In a first step, the mobile vehicle 10 is coupled to the nose landing gear A1 of the aircraft via the coupling mechanism 13 of the vehicle. The operator descends from the vehicle and unwinds the pipe 22, then opens the hatch in order to connect the pipe fitting 23 of the pipe manually to the high-pressure connector A2 of the aircraft. The pipe fitting 23 connected to the high-pressure connector A2 holds the hatch open.

Furthermore, so that the pipe 22 does not trail on the ground, the operator places and arms, one by one, each of the suspension devices 400 under the fuselage, acting on the handles 405a so that the devices are suspended under the fuselage via their pneumatic suction cups 403. In this way, the air pipe 22, held by the handles 405a of the different suspension devices 400, is suspended under the fuselage of the aircraft A and the latter can taxi without any risk of damaging the pipe 22.

The operator then remounts into the driver compartment 12 of the vehicle 10, and once the sensors 32 of the controlling system 30 indicate that the pipe 22 and the suspension devices 400 are correctly suspended, the operator sets off, acting on the man-machine interface 34, the air compressor 21 in order to supply pressurized air to the aircraft via the pipe.

The pilots of the aircraft A can then switch on the systems of the aircraft A such as the air conditioning of the cabin or cooling for the avionics.

In a next step, the vehicle 10 tows the aircraft A to the runway threshold on the taxiways allocated by the control tower. During this step, the engines A3 of the aircraft are not ignited and the propulsion of the aircraft is ensured only by the vehicle 10 according to the invention.

Once the aircraft A has arrived at the runway threshold, the pilots start each engine (one by one) using the pressurized air supplied by the compressor 21 to start the fans of the engines A3.

Following authorization from the pilots of the aircraft, the operator acts on the man-machine interface 34 to disconnect the vehicle 10 from the nose landing gear A1 of the aircraft, and to disconnect the pneumatic supply system 20. In order to disconnect the pneumatic supply system, an electric signal is sent simultaneously by the central unit 31 to the actuators 33 of the device 25 for connecting/disconnecting the pipe fitting 23 and to the actuator 33 of the device 405 for arming/disarming each suspension device 400.

The pipe 22 and the suspension devices 400 then fall to the ground under the effect of their own weight and the operator can wind the pipe 22 and the suspension devices 400 in the vehicle compartment by controlling the winder E to function via the man-machine interface 34. After this last step, the vehicle 10 can return to the apron area and the aircraft A can take off.

The invention makes it possible for the aircraft A to be moved by the vehicle 10 up to the runway threshold without starting the engines. The invention therefore makes it possible for the airline companies to make substantial savings on fuel. This is because the fuel consumption of the vehicle 10, both for towing the aircraft A and for supplying it with pressurized air, is very low compared with the consumption of an aircraft engine A3, even at idling speed. During the movement of the aircraft, the pneumatic supply system 20 of the vehicle provides the pneumatic supply necessary for correct functioning of the systems of the aircraft A. This supply is necessary in particular for starting the engines A3 before the runway threshold.

Remote disconnection of the pneumatic supply system 20 satisfies the airport safety requirements in that it makes it possible to avoid an operator descending from the vehicle on the taxiways in order to disconnect the pneumatic supply system 20 manually from the aircraft.

The embodiments described above of the device 25 for arming/disarming the pipe fitting 23 and of the device 405 for arming/disarming each suspension device 400 are given solely as examples. Other embodiments of these devices, within the reach of the person skilled in the art, can be envisaged without leaving the framework of this invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A towing vehicle comprising:
   a body supported on a plurality of wheels;
   a driver compartment of the towing vehicle;
   an aircraft coupler for selectively coupling the towing vehicle to an aircraft wherein the towing vehicle is configured to tow the aircraft during movements by the aircraft on the ground;
   a pneumatic supply system configured to supply a pressurized air to the aircraft, said pneumatic supply system being manually connectable to a high-pressure connector of the aircraft;
   a pneumatic supply line joined to the towing vehicle having a pneumatic supply fitting located at a free end of the pneumatic supply line, the pneumatic supply fitting connectable to the high-pressure connector of the aircraft; and
   a controller in communication with a fluid connection between the pneumatic supply fitting and the high-pressure connector of the aircraft wherein the connection between the pneumatic supply fitting and the high-pressure connector of the aircraft is remotely disconnected by a signal delivered by the controller.

2. The towing vehicle as claimed in claim 1 wherein the controlling system comprises a plurality of actuators, an activation of the plurality of actuators causes a disconnection of the pneumatic supply system from the high-pressure connector of the aircraft.

3. The towing vehicle as claimed in claim 2, wherein the controller includes a man-machine interface arranged in the driver compartment of the towing vehicle, said actuators being configured to be activated via an interaction of an operator with the man-machine interface.

4. The towing vehicle as claimed in claim 2, wherein the pneumatic supply system comprises:
   a compressor,
   an air pipe connected to the compressor, and
   the pneumatic supply fitting arranged at a free extremity of the pipe.

5. The towing vehicle as claimed in claim 4, wherein the pneumatic supply system comprises a suspension device fastened to the pipe, the suspension device having a pneumatic suction cup controlled by a vacuum pump wherein the pneumatic suction cup is attachable to the fuselage of the aircraft, the suspension device further having a device for arming/disarming the suction cup in order to suspend the suspension device manually on the fuselage of the aircraft via the suction cup, an actuator of the controlling system includes the device arming/disarming for arming/disarming the suction cup in order to remove the suspension device from said fuselage on activation of said actuator.

6. A towing vehicle for maneuvering an aircraft and for supplying pressurized air to said aircraft, said vehicle being configured to tow the aircraft during its movements on the ground and comprising:
   a pneumatic supply system configured to supply pressurized air to the aircraft, said pneumatic supply system being manually connectable to a high-pressure connector of the aircraft, the pneumatic supply system being remotely disconnectable from said high-pressure connector;
   a controlling system for said pneumatic supply system, said controlling system including a plurality of actuators, an activation of the plurality of actuators effects a disconnection of the pneumatic supply system from the high-pressure connector of the aircraft;
   a compressor;
   an air pipe connected to the compressor; and
   a pipe fitting arranged at a free extremity of the pipe to effect manual connection of the pipe fitting to the high-pressure connector of the aircraft;
   wherein the pneumatic supply system comprises a suspension device fastened to the pipe, the suspension device having a pneumatic suction cup controlled by a vacuum pump wherein the pneumatic suction cup is attachable to the fuselage of the aircraft, the suspensions device having a device for arming/disarming the suction cup in order to suspend the suspension device manually on the fuselage of the aircraft via the suction cup, a first actuator of the controlling system includes the device for arming/disarming the suction cup in order to remove the suspension device from the fuselage on activation of the first actuator.

* * * * *